United States Patent
Wetherell

(10) Patent No.: US 8,949,154 B2
(45) Date of Patent: Feb. 3, 2015

(54) CONTENT FEED USER INTERFACE WITH GALLERY DISPLAY OF SAME-TYPE ITEMS

(75) Inventor: Christopher Jason Wetherell, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1902 days.

(21) Appl. No.: 11/246,657

(22) Filed: Oct. 7, 2005

(65) Prior Publication Data

US 2007/0083468 A1  Apr. 12, 2007

(51) Int. Cl.
*G06F 21/00* (2013.01)
*G06F 21/10* (2013.01)
*G06F 17/30* (2006.01)

(52) U.S. Cl.
CPC .......... *G06F 21/10* (2013.01); *G06F 17/30713* (2013.01); *G06F 17/30699* (2013.01); *G06F 17/3089* (2013.01)
USPC ...... 705/51; 707/E17.116; 707/736; 707/737; 707/754

(58) Field of Classification Search
USPC .......................................................... 705/51
See application file for complete search history.

(56) References Cited

U.S. PATENT DOCUMENTS

| | | | |
|---|---|---|---|
| 5,659,742 A * | 8/1997 | Beattie et al. ............... | 707/104.1 |
| 5,872,921 A | 2/1999 | Zahariev et al. | |
| 6,138,147 A | 10/2000 | Weaver et al. | |
| 6,154,752 A | 11/2000 | Ryan | |
| 6,587,127 B1 * | 7/2003 | Leeke et al. ................... | 715/765 |
| 6,701,350 B1 | 3/2004 | Mitchell ........................ | 709/217 |
| 6,831,667 B1 | 12/2004 | Russin et al. | |
| 7,003,759 B2 * | 2/2006 | Jameson ........................ | 717/120 |
| 7,047,502 B2 * | 5/2006 | Petropoulos et al. ......... | 715/781 |
| 7,149,353 B2 | 12/2006 | Siegel et al. ................... | 382/190 |
| 7,181,682 B1 * | 2/2007 | Manson ......................... | 715/234 |
| 7,293,019 B2 | 11/2007 | Dumais et al. | |
| 7,360,167 B2 | 4/2008 | Hennum et al. | |
| 7,412,534 B2 | 8/2008 | Tsang et al. ................... | 709/231 |
| 7,581,166 B2 | 8/2009 | Renger et al. | |
| 7,590,691 B2 | 9/2009 | Gonsalves et al. | |
| 7,665,036 B1 | 2/2010 | Lin et al. | |
| 7,770,130 B1 | 8/2010 | Kaptelinin | |
| 7,818,659 B2 | 10/2010 | Kahn et al. | |

(Continued)

FOREIGN PATENT DOCUMENTS

| CN | 1473301 A | 2/2004 |
|---|---|---|
| KR | 10-0445784 B1 | 8/2004 |
| WO | WO 2005/089336 A2 | 9/2005 |

OTHER PUBLICATIONS

Music on Yahoo!, published on Apr. 26, 2004.*

(Continued)

*Primary Examiner* — Steven Kim

(74) *Attorney, Agent, or Firm* — Morgan, Lewis & Bockius LLP

(57) ABSTRACT

Additional content items that satisfy predefined criteria with respect to a user-selected content item are identified. The predefined criteria may be that the selected and additional content items have particular characteristics that are the same. Information corresponding to the selected and identified content items is presented to a user. Characteristics based on which additional content items may be identified may include data type, source, and absence of content. The information may be presented in a gallery view, which can be a thumbnails gallery for images or a playlist for digital audio or video.

18 Claims, 9 Drawing Sheets

(56) References Cited

U.S. PATENT DOCUMENTS

| | | | |
|---|---|---|---|
| 7,865,830 B2 | 1/2011 | Kim et al. | |
| 8,327,297 B2 | 12/2012 | Van Valen, III | |
| 2002/0004821 A1 | 1/2002 | Togawa et al. | |
| 2002/0096563 A1 | 7/2002 | Singhal | 705/382.5 |
| 2002/0120609 A1 | 8/2002 | Lang et al. | |
| 2002/0165881 A1 | 11/2002 | Shelton | |
| 2003/0050863 A1 | 3/2003 | Radwin | 705/27 |
| 2003/0097453 A1 | 5/2003 | Fuchigami et al. | |
| 2003/0184583 A1 | 10/2003 | Lim | 345/738 |
| 2004/0189695 A1 | 9/2004 | Kurtz et al. | 345/738 |
| 2004/0204128 A1 | 10/2004 | Zakharia et al. | |
| 2005/0021680 A1 | 1/2005 | Ekis et al. | |
| 2005/0033657 A1* | 2/2005 | Herrington et al. | 705/26 |
| 2005/0114790 A1 | 5/2005 | Dunbar et al. | |
| 2005/0131866 A1 | 6/2005 | Badros et al. | 707/3 |
| 2005/0132067 A1 | 6/2005 | Bennett et al. | 709/228 |
| 2005/0135361 A1 | 6/2005 | Lim et al. | |
| 2005/0188320 A1 | 8/2005 | Bocking | |
| 2005/0216452 A1 | 9/2005 | Teague | 707/3 |
| 2005/0289468 A1* | 12/2005 | Kahn et al. | 715/738 |
| 2006/0002317 A1* | 1/2006 | Punaganti Venkata | 370/310 |
| 2006/0015651 A1 | 1/2006 | Freimuth et al. | |
| 2006/0031335 A1 | 2/2006 | Carey | |
| 2006/0059225 A1 | 3/2006 | Stonehocker et al. | |
| 2006/0073812 A1 | 4/2006 | Venkata et al. | 455/412.1 |
| 2006/0095507 A1 | 5/2006 | Watson | |
| 2006/0095628 A1* | 5/2006 | Ludwig et al. | 710/302 |
| 2006/0129917 A1* | 6/2006 | Volk et al. | 715/513 |
| 2006/0155698 A1 | 7/2006 | Vayssiere | 707/6 |
| 2006/0167860 A1 | 7/2006 | Eliashberg et al. | |
| 2006/0173985 A1* | 8/2006 | Moore | 709/223 |
| 2006/0230021 A1* | 10/2006 | Diab et al. | 707/3 |
| 2006/0265503 A1 | 11/2006 | Jones et al. | |
| 2006/0279799 A1 | 12/2006 | Goldman | |
| 2006/0282822 A1 | 12/2006 | Weng | 717/114 |
| 2006/0288011 A1 | 12/2006 | Gandhi | |
| 2007/0016609 A1* | 1/2007 | Kim et al. | 707/104.1 |
| 2007/0027865 A1 | 2/2007 | Bartz et al. | |
| 2007/0060136 A1 | 3/2007 | Ramer et al. | 455/445 |
| 2007/0061333 A1 | 3/2007 | Ramer et al. | |
| 2007/0061711 A1* | 3/2007 | Bodin et al. | 715/523 |
| 2007/0078884 A1 | 4/2007 | Ott, IV et al. | 707/102 |
| 2007/0094390 A1 | 4/2007 | Nussey | |
| 2007/0100959 A1 | 5/2007 | Eichstaedt et al. | |
| 2007/0100978 A1 | 5/2007 | Levi et al. | |
| 2007/0130589 A1 | 6/2007 | Davis et al. | |
| 2007/0159651 A1 | 7/2007 | Disario et al. | |
| 2007/0162842 A1 | 7/2007 | Ambachtsheer et al. | |
| 2007/0168522 A1 | 7/2007 | Van Valen | |
| 2007/0192318 A1 | 8/2007 | Ramer et al. | 707/7 |
| 2007/0203906 A1 | 8/2007 | Cone et al. | 707/6 |
| 2007/0226207 A1 | 9/2007 | Tawde | |
| 2007/0240041 A1 | 10/2007 | Pearson | |
| 2007/0244901 A1 | 10/2007 | Mohler et al. | |
| 2007/0271202 A1 | 11/2007 | O'Connor | |
| 2008/0010337 A1 | 1/2008 | Hayes et al. | |
| 2008/0013266 A1 | 1/2008 | Yamada et al. | |
| 2008/0046459 A1 | 2/2008 | Hinohara | |
| 2008/0052742 A1 | 2/2008 | Kopf et al. | |
| 2008/0117911 A1 | 5/2008 | Rajakarunanayake et al. | |
| 2008/0126476 A1* | 5/2008 | Nicholas et al. | 709/203 |
| 2008/0155118 A1 | 6/2008 | Glaser et al. | |
| 2008/0214155 A1 | 9/2008 | Ramer et al. | 455/414.1 |

OTHER PUBLICATIONS

Yahoo! News—Most Emailed—Photos, Published on Apr. 2, 2004.*
Yahoo! News—Front Page, published on May 9, 2004.*
Trey Martindale and David A. Wiley, "Using weblogs in scholarship and teaching", Mar. 2004, Springer Boston, ISSN 8756-3894, vol. 49, No. 2, pp. 55-61.*
Robert S. Kennedy, "Weblogs, Social Software, and New Interactivity on the Web", Mar. 2004, Psychiatric Services, vol. 55 No. 3, pp. 247-249.*
Amazon.com screenshot from wayback machine dated May 18, 2005.*
International Search Report for International Application No. PCT/US2006/039263, mailed Feb. 26, 2007.
Daily, G., "Aggregating the Aggregators: RSS Reader Round-Up," www.econtentmag.com, Apr. 2005, pp. 36-41.
Hammersley, B., "Content Syndication with RSS," http://safari.oreilly.com/0596003838, Chapters 9-10, Mar. 2003.
Winer, D., "RSS 2.0 Specification," http://blogs.law.havard.edu/tech/rss, Jan. 30, 2005.
Nottingham, N., et al., "The Atom Syndication Format," The Internet Society, http://www.ietforg/intentet-drafts/draft-ietf-atompub-for-mat-11.txt, Aug. 15, 2005.
Adachi, Implementation of bookmark with categorization and metadata, Mar. 2, 2005, 3 pgs.
Apple Mail's Notification Badge Cracks a Joke, Hawk Wings, Nov. 27, 2005, 2 pgs.
Blogger buzz, Next blog, now with less spam!, Sep. 2, 2005, 2 pgs.
Cold, Using really simple syndication (RSS) to enhance student research, Jan. 2006, 4 pgs.
Flickr:Help:Photos, How do I upload my photos?, Feb. 28, 2007, 13 pgs.
GettingStartedRojo, Getting Started with Rojo, Nov. 27, 2005, 6 pgs.
Google Inc., Communication pursuant to Article 94(3) EPC, EP 06816479.7, May 13, 2014, 5 pgs.
Google Inc., Decision of Rejection, JP 2008-534740, Aug. 15, 2013, 3 pgs.
Google Inc., International Preliminary Report on Patentability, PCT/US2006/039566, Mar. 25, 2010, 10 pgs.
Google Inc., Notice of Allowance, KR 2009-7008586, May 27, 2014, 1 pg.
Google Inc., Notice to File a Response, KR 2009-7008586, Sep. 26, 2013, 6 pgs.
Google Inc., Notification on the Grant of Patent Right for Invention, CN 201110228972.2, Jan. 10, 2014, 1 pg.
Google Inc., Office Action, AU 2006302318, Mar. 8, 2011, 2 pgs.
Google Inc., Office Action, CA 2,624,868, May 10, 2011, 3 pgs.
Google Inc., Office Action, CN 200780044075.8, Sep. 13, 2010, 8 pgs.
Google Inc., Office Action, CN 201110228972.2, Dec. 14, 2012, 10 pgs.
Google Inc., Office Action, CN 201110228972.2, Apr. 23, 2012, 12 pgs.
Google Inc., Office Action, EP 07843545.0, Jul. 13, 2011, 5 pgs.
Google Inc., Office Action, JP 2008-534740, Oct. 9, 2012, 6 pgs.
Google Inc., Office Action, JP 2008-534740, Dec. 19, 2011, 4 pgs.
Google Inc., Supplementary ESR, EP 07843545.0, Oct. 11, 2010, 4 pgs.
Guillep2k, New 'mark as read' feature behavior, Mar. 26, 2002, 8 pgs.
Moreover, Creating a custom feed, Jan. 24, 2001, 3 pgs.
Moreover, Put Free headlines on your site in any topic, Jan. 24, 2001, 2 pgs.
Parmar, Unread email in Outlook subfolders, Mar. 21, 2005, 3 pgs.
Quick Online Tips, Check your feedburner RSS feed size, May 19, 2009, 4 pgs.
Rai, Using Bloglines (or How to keep up dwith dozens of blogs everyday), Apr. 25, 2005, 35 pgs.
Rojo Tour, Welcome to the Rojo Tour!. 01AUG2705, 27 pgs.
Rojo's Frequently Asked Questions, Dec. 2, 2005, 13 pgs.
Rose, Cobra: content-based filtering and aggregation of blogs and RSS feeds, Apr. 11-13, 2007, 19 pgs.
Rowse, Bloglines add Keyboard Shortcuts—Hotkeys, Oct. 13, 2005, 7 pgs.
RSSOwl elements, the main screen, Nov. 7, 2005, 2 pgs.
RSSOwl elements: the main screen, Sep. 8, 2006, 1 pg.
Sifri, New technorati features: favorites and readling lists/OPML for blog finder, Feb. 21, 2006, 5 pgs.
Takizawa, An RSS reader based on multiple user's information, Mar. 2, 2005, 6 pgs.
Technorati Favorites, Add a Favorite, Feb. 28, 2007, 3 pgs.
Trapani, Geek to Live: From Bloglines to Google Reader, Oct. 6, 2006, 5 pgs.

* cited by examiner

CONTENT FEED USER INTERFACE WITH GALLERY DISPLAY OF SAME-TYPE ITEMS

RELATED APPLICATIONS

U.S. patent application Ser. No. 11/246,657, titled "Personalized Content Feed Suggestions Page," filed Oct. 7, 2005;

U.S. patent application Ser. No. 11/246,656, titled "Indirect Subscriptions to Top N Lists of Content Feeds," filed Oct. 7, 2005; and U.S. patent application Ser. No. 11/246,597, titled "Indirect Subscriptions to a User's Selected Content Feed Items," filed Oct. 7, 2005.

TECHNICAL FIELD

The disclosed embodiments relate generally to content syndication, and more particularly, to a content feed user interface with a gallery display of content feed items of the same type.

BACKGROUND

Content syndication is growing in popularity as a way to distribute frequently updated information, such as news and blog postings, on the Internet. Using content syndication formats such as Really Simple Syndication (RSS), content providers can include content and/or links to such in a content feed. Users may subscribe to these content feeds using an application known as a reader or aggregator. When the content feed is updated with new content items, the new content items are reflected in the user's reader.

A user may subscribe to many content feeds, with each feed listing many content items. A user may be interested in content of particular types, such as images or videos, or content from particular sources and/or categories. Looking through the many listed content items to find the ones of the desired type can be a time-consuming and cumbersome task for the user.

Accordingly, there is a need for a more efficient manner of presenting content items to the user.

SUMMARY

In accordance with some embodiments, a method of presenting content includes presenting identifying information associated with a number of content items; upon user selection of one of the content items, identifying one or more additional content items that satisfy predefined criteria with respect to the selected content item; and presenting information corresponding to the selected and additional content items.

In some embodiments, the content items include RSS feed content items

In some embodiments, the aforementioned operations may be performed by a system having one or more processors, memory, and one or more modules, stored in the memory and configured for execution by the processors, with instructions to perform the aforementioned operations.

BRIEF DESCRIPTION OF THE DRAWINGS

Like reference numerals refer to corresponding parts throughout the drawings.

DESCRIPTION OF EMBODIMENTS

In a content feed aggregation system, a user may subscribe to one or more content feeds and be presented with the content items included in those content feeds. However, the user may be interested in particular types of content items. The disclosed embodiments provide the user a way to look for those particular types of content items. When a user selects a content item, the user is presented with a "gallery" of the selected content item and other content items that satisfy predefined criteria with respect to the selected item. The "gallery" provides the user a more efficient manner of presenting to the user content items of particular types.

Figure 1:
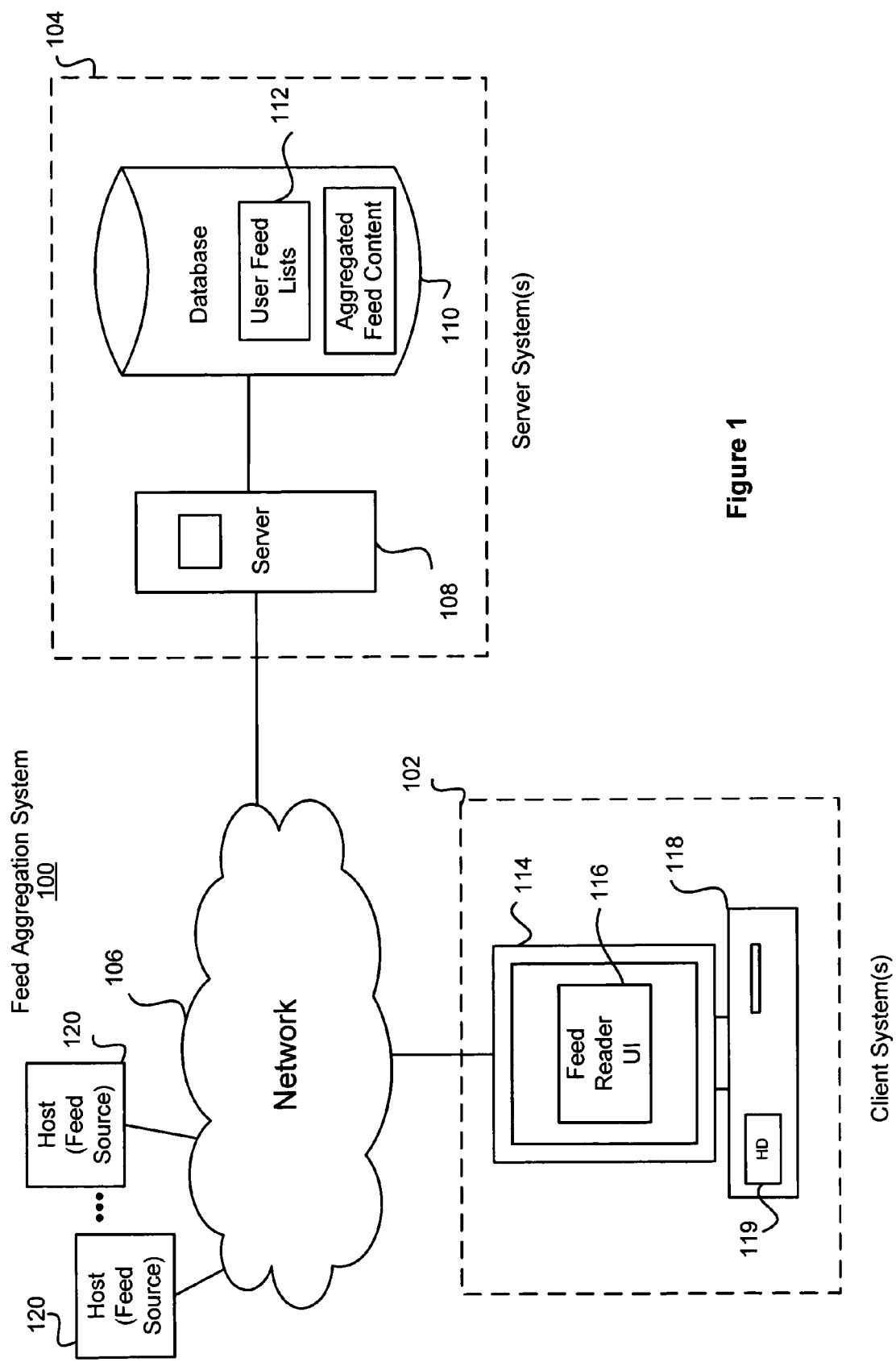
FIG. 1 is a block diagram illustrating a content feed aggregation system in accordance with some embodiments.

FIG. 1 is a block diagram illustrating a content feed aggregation system in accordance with some embodiments. The content feed aggregation system 100 includes a server system 104. The server system 104 is coupled to one or more client systems 102 and to one or more hosts 120 (or "feed sources") by a network 106. The network 106 may be any suitable wired and/or wireless network and may include a local area network (LAN), wide area network (WAN), the Internet, and so forth.

The server system 104 accesses content feeds from the feed sources 120. The server system 104 includes a server 108 and a database 110. Server 108 serves as a front-end for the server system 104. Server 108 retrieves the content feeds from the feed sources 120. The server 108 provides an interface between the server system 104 and the client systems 102.

The server system 104 stores content items in the content feeds in the database 110. In some embodiments, the database 110 stores both metadata (e.g., title, description, URL, date/time, and possibly other metadata) and the content of each content item. However, in some other embodiments, the database 110 stores the metadata but not the content for each content item. The database 110 also stores user feed information 112 for a plurality of users. The user feed information for a particular user identifies content feed subscriptions, as well as sources, filters, and read states for that particular user. That is, user feed information associated with a user identifies the content feeds to which the user has subscribed, any filters the user has defined for the feeds, any labels the user has associated with individual feed items, and an indication of whether each feed item has been marked as "read" by the user.

It should be appreciated that the server system 104, including the server 108 and the database 110, may be implemented as a distributed system of multiple computers. However, for convenience of explanation, the server system 104 is described below as being implemented on a single computer, which can be considered a single logical system.

A content feed (or channel) is a resource or service that provides a list of content items that are present, recently added, or recently updated at a feed source 120. A content item in a content feed may include the content associated with the item itself (the actual content that the content item specifies), a title and/or a description of the content, a locator (e.g., URL) of the content, or any combination thereof. For example, if the content item identifies a text article, the content item may include the article itself inline, along with the title and locator. Alternatively, a content item may include the title, description and locator, but not the article content. Thus, some content items may include the content associated with those items, while others contain links to the associated content but not the full content of the items. A content item may also include additional metadata that provides additional information about the content. The full version of the content may be any machine-readable data, including but not limited to web pages, images, digital audio, digital video, Portable Document Format (PDF) documents, and so forth. Further details regarding content items are described below, in relation to FIG. 2.

In some embodiments, a content feed is specified using a content syndication format, such as RSS. RSS is an acronym that stands for "rich site summary," "RDF site summary," or "Really Simple Syndication." RSS may refer to any of a family of formats based on the Extensible Markup Language (XML) for specifying a content feed and content items included in the feed. In some other embodiments, other content syndication formats, such as the Atom syndication format or the VCALENDAR calendar format, may be used to specify content feeds.

Further information regarding the RSS syndication format known as "Really Simple Syndication" is disclosed in the *RSS 2.0 Specification* by D. Winer, which is hereby incorporated by reference herein in its entirety. M. Nottingham et al. disclose further information regarding the Atom syndication format in *The Atom Syndication Format*, which is hereby incorporated by reference herein in its entirety.

A user interfaces with the server system 104 and views content items at a client system or device 102 (hereinafter called the client system for ease of reference). The client system 102 includes a computer 118 or computer controlled device, such as a person digital assistant, cellular telephone or the like (hereinafter called the client system for ease of reference). The computer 118 typically includes one or more processors (not shown); memory, which may include volatile memory (not shown) and non-volatile memory such as a hard disk drive 119; and a display 114. The computer 118 may also have input devices such as a keyboard and a mouse (not shown).

In some embodiments, a user may interact with the server system 104 via a feed reader user interface 116 that may be presented on the display 114. The user may create a list of feed subscriptions via the feed reader user interface 116. In some embodiments, using the feed reader user interface 116, the user may also create filters or labels to be applied to content feeds and/or content items, and modify the read states of content feeds and/or content items. The feed reader user interface transmits a list of content feed subscriptions, or modifications to a list of content feed subscriptions, to the server system 104 for storage at the database 110. The feed reader user interface 116 presents content items stored at the database 110 to the user based on the user's list of content feed subscriptions. That is, feed reader user interface 116 presents to the user content items specified in the content feeds to which the user has subscribed. A user may view the full version of the content of a content item in the feed reader user interface 116 by selecting it (e.g., by clicking on it with a mouse pointer). In some embodiments, a copy of the user's list of content feed subscriptions and copies of the presented content items may be cached locally at the client system 102.

In some embodiments, the feed reader user interface 116 may be a web-based user interface. That is, the feed reader user interface 116 displays one or more web pages in one or more browser (e.g., web browser) windows. The web pages may be written in the Hypertext Markup Language (HTML), Extensible Markup Language (XML), or any other suitable language for preparing web pages, and may include one or more scripts for interfacing with the server system 104. The user may subscribe to content feeds, view content items, and otherwise interact with the server system 104 by interacting with the web pages of the feed reader user interface 116. In other words, the server system 104, and the web pages transmitted by the server system 104 to the feed reader user interface 116, provides a web-based content aggregation service. The server system 104 aggregates and stores content items in accordance with the user's content feed subscriptions. In some embodiments, the server system 104 also can apply filters or labels, or change the read states of content items in accordance with user actions or instructions. When the user accesses the feed reader user interface 116, content items to which the user has subscribed are presented to the user via the feed reader user interface 116.

In some other embodiments, the feed reader user interface 116 may be a part of a standalone application that is run on the client system 102. The standalone application may interface with the servers system 104 via an application programming interface (API).

Figure 2:
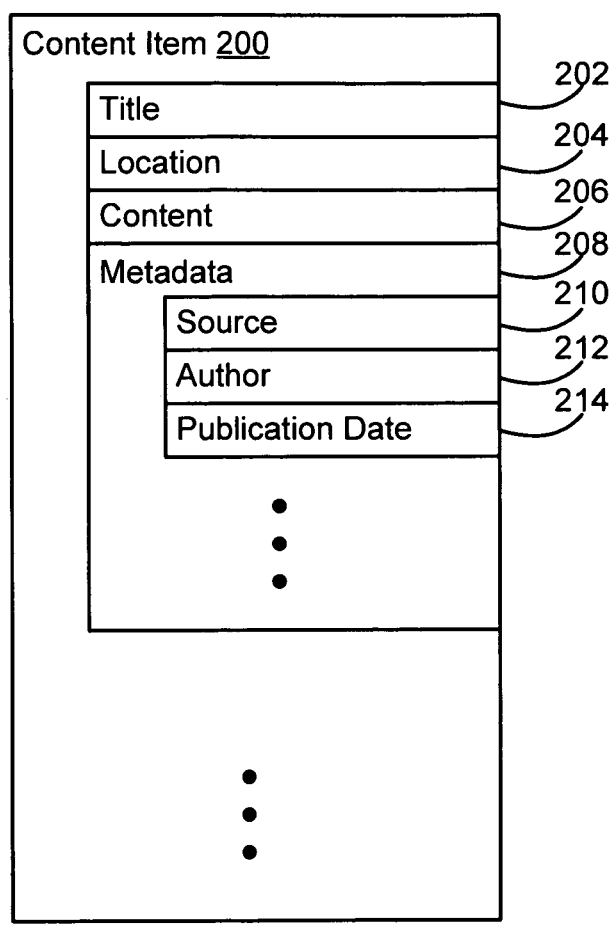
FIG. 2 is a diagram illustrating a data structure of a content item and its corresponding metadata in accordance with some embodiments.

FIG. 2 is a diagram illustrating a data structure of a content item and its corresponding metadata in accordance with some embodiments. A content feed may include one or more content items. Each content item, in turn, includes information about the full version of the content and possibly the full version itself. The information may be contained in one or more fields. A content item 200 may include a title 202 of the content item. A location 204 of the content item identifies a location of the full version of the content. In some embodiments, the location 204 is the Uniform Resource Locator (URL) of the full version of the content. In some other embodiments, other forms of location identifiers or addresses may be used to identify the location of the full version of the content.

A content field 206 may include a synopsis or description of the full version of the content, an excerpt from the content, or the full version itself. The full version of the content may be any machine readable data, such as text, graphics, digital audio, digital video, a Portable Document Format (PDF) file, and so forth.

In some embodiments, the full version of the content may be an enclosure to the content item. In the content item data structure, the enclosure may be specified by an enclosure location that identifies the location of the enclosure. In some embodiments, the enclosure location is the URL of the enclosure. The data structure may also include a size field for specifying the size of the enclosure (e.g., in number of bytes), and a data type field to identify the type of the enclosure. The data type may identify the data category of the enclosure, the file type of the enclosure, or both. For example, if the enclosure is a JPEG image file, the data type may specify that the enclosure is an "image", that the enclosure is a JPEG file, or that the enclosure is an "image" of the JPEG file type. In some embodiments, the data type may be specified using the Multipurpose Internet Mail Extensions (MIME) standard, which is well-known in the art and need not be further described.

The content item 200 may include one or more metadata fields 208. For example, the content item may include a source identifier 210 to identify the source content feed of the content item, an author name or identifier 212 to identify the author of the particular content item, and a publication date 214 to identify the date on which the content item was published.

It should be appreciated that the data structure for the content item 200 and the described fields are merely exemplary. A content item may include a subset of the fields identified above, may include additional fields, and may take on alternative formats.

Figure 3:
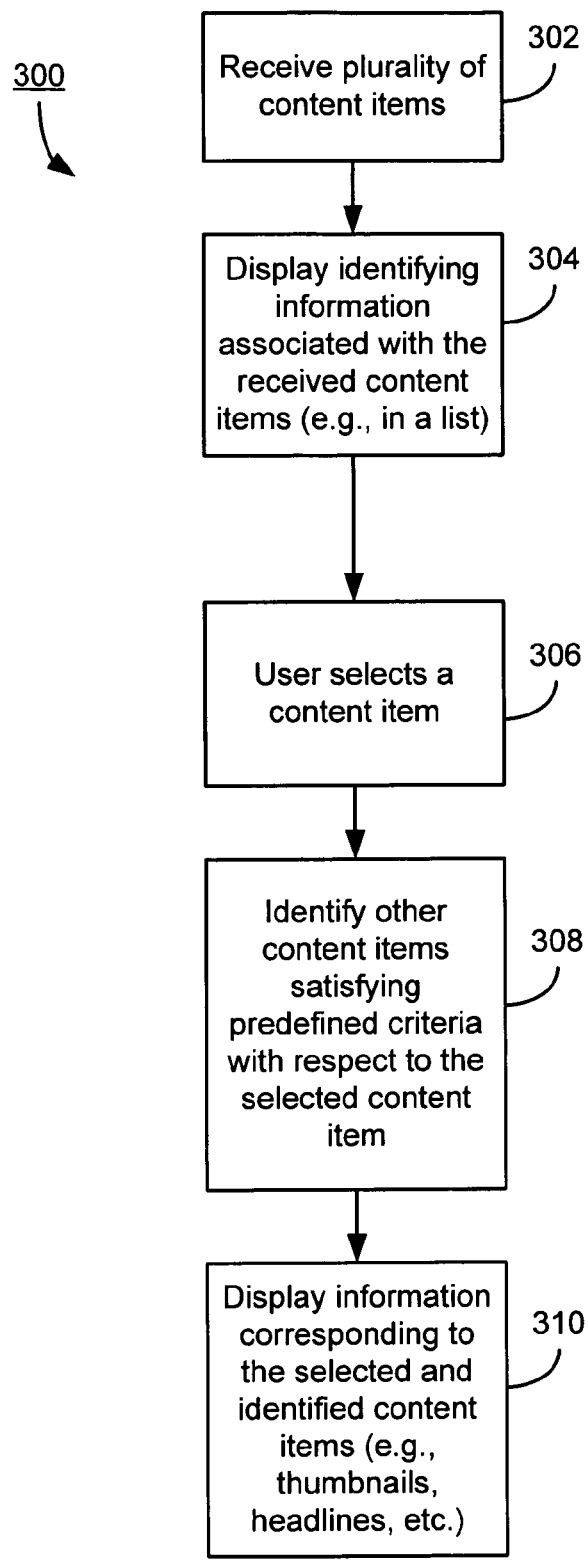
FIG. 3 is a flow diagram illustrating a process for displaying a gallery of content items in accordance with some embodiments.

Attention is now directed to FIG. 3, which is a flow diagram illustrating a process for displaying a gallery of content items in accordance with some embodiments. While the process flow 300 described below includes a number of steps or operations that appear to occur in a specific order, it should be apparent that these processes can include more or fewer steps or operations. Some of the operations that are described here as being executed serially may be performed in parallel (e.g., using parallel processors or a multi-threading environment). Furthermore, in some embodiments, some of the operations (e.g., operations 302-304) may be performed multiple times before a following operation (e.g., operation 306) is performed.

A plurality of content items is received (302). The received content items are specified in content feeds to which the user has subscribed. In some embodiments, the content items are provided by the server system 104 (FIG. 1) to the client system 102 (FIG. 1).

Identifying information associated with the received content items are displayed (304). In some embodiments, the identifying information is displayed as a list of content items in the feed reader user interface 116 (FIG. 1). In some embodiments, the feed reader user interface 116 may have a finite display area. In such circumstances, identifying information for a subset of the received content items may be in view at a given time. The user may scroll through the list to view identifying information associated with other received content items. The list may display all or a subset of the content item fields. For example, the displayed identifying information may include the titles and the source content feeds of the content items. In some embodiments, the identifying information that is displayed (that is, the fields that are displayed) may be configured by the user.

In some embodiments, the list includes content items from all subscribed feeds. This may be referred to as the "universal" view, or an interleaved list. That is, content items from the subscribed content feeds are all displayed in the same list and not separated by source. In some embodiments, the list may be sorted by the publication date and time of the content item, for example in reverse chronological order. In some other embodiments, the user may toggle an option to display a universal view, to display the items ordered by source, author, or some other field, or to display only content items from a particular source, by a particular author, or the like.

The user selects a content item from the list (306). The user may select a content item by clicking on the content item with a mouse pointer or by using keyboard commands.

In response to the selection, other content items in the list satisfying predefined criteria with respect to the selected content item are identified (308). In some embodiments, other content items that are the same as the selected content item with respect to a set of predefined characteristics are identified. Thus, the predefined criteria may require content items to match one or more characteristics of the selected content items. That is, additional content items are identified based on matches to a particular set of characteristics of the selected item. For example, additional content items having the same data type and source content feed as the selected item are identified. In some embodiments, the characteristics that serve as criteria for identifying additional content items may be configured in advance by the user.

In some embodiments, an exemplary characteristic for identifying additional content items is the data type of the full version of the content of a content item. When the user selects a content item and the content item includes content such as an image, digital audio, or digital video, additional content items also having an image, digital audio, or digital video are identified, respectively. In some embodiments, the identification may be based on the data category, such as whether the object is an image, digital audio, etc. The data category may be explicitly specified by the content item or inferred from the file type of the content. For example, if the content item includes an MPEG digital video, other content items that includes a file of any file type recognized as digital video (such as QUICKTIME, WINDOWS MEDIA, REALVIDEO, etc.) may be identified. In some other embodiments, the identification may be based on the specific file type, rather than data categories. For example, if the content item includes a JPEG image, other content items including a JPEG image, but not images of other file types such as GIF or TIFF images, may be identified.

Another exemplary characteristic for identifying additional content items is that the additional content items follow the same format as the selected content item, in that if the selected content item includes a title 202 (FIG. 2) and a location 204 (FIG. 2) but no content 206 (FIG. 2), then the additional content items must also each have a title and a location but no content. This criterion may be helpful in identifying content items that include headlines (in the title) and links to the articles having the headlines.

It should be appreciated that data type and format are merely exemplary characteristics on which other content items may be identified. Other characteristics, including but not limited to source, author, and/or publication date (or a publication date range), may be used as identification criteria. Furthermore, any combination of the characteristics may be used as the identification criteria. For example, the identification criteria may be that the additional content items must have the same data type and the same source as the selected content item.

Information corresponding to the selected content item and the identified additional content items are presented to the user (310). The information is displayed in a "gallery" view. The gallery view includes a collection of information for each of the selected and additional content items (or at least a subset of the selected and additional content items, due to finite display regions). The gallery view provides a preview of the selected and additional content items. The gallery view gives the user an at-a-glance look of the selected and additional content items. From the gallery view, the user may select a content item for viewing.

In some embodiments, the information that is displayed in the gallery may depend at least in part on the identification criteria. For example, if the identification criteria include having the same data type, then the information that is displayed may be information that is related to the data type of the selected and additional content items. Further information regarding the gallery view and the information that is displayed in the gallery view is described below, in relation to FIGS. 6-10.

Figure 4:
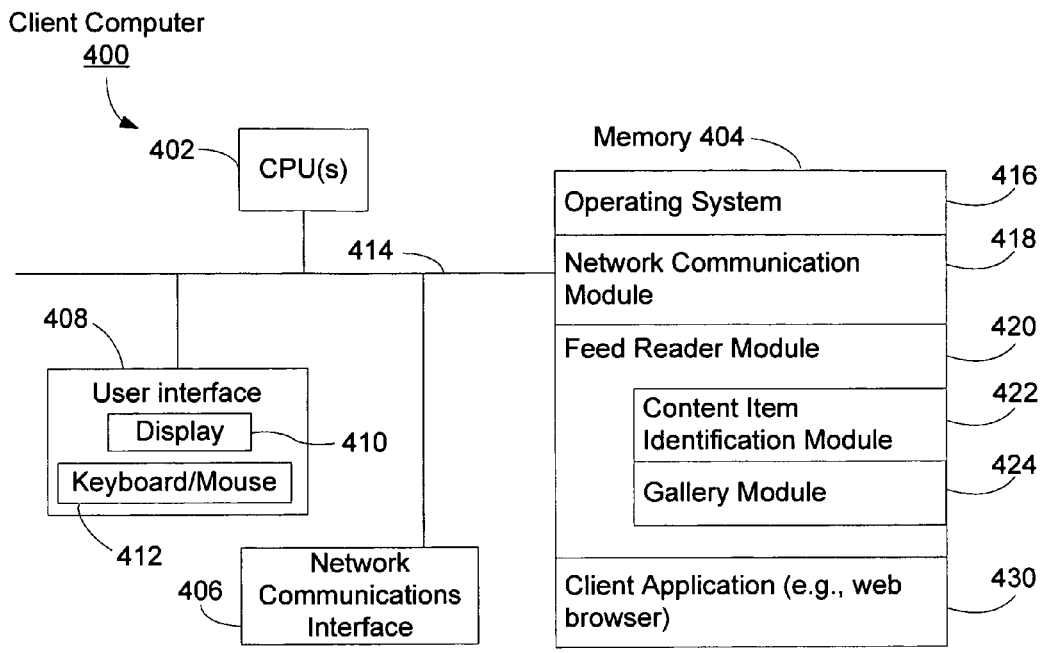
FIG. 4 is a block diagram illustrating a client computer in accordance with some embodiments.

FIG. 4 is a block diagram illustrating a client computer in accordance with some embodiments. The client computer 400 typically includes one or more processing units (CPU's) 402, one or more network or other communications interfaces 406, memory 404, and one or more communication buses 414 for interconnecting these components. The client computer 400 may also include a user interface 408 comprising a display device 410 and a keyboard and/or mouse (or some other pointing device) 412. Memory 404 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 404 may optionally include one or more storage devices remotely located from the CPU(s) 402. Memory 404, or alternately one or more non-volatile solid state storage devices within memory 404, includes a computer readable storage medium. In some embodiments, memory 404 stores the following programs, modules and data structures, or a subset thereof:

- an operating system 416 that includes procedures for handling various basic system services and for performing hardware dependent tasks;
- a network communication module 418 that is used for connecting the client system 400 to other computers via the one or more communication network interfaces 406 and one or more communication networks, such as the Internet, other wide area networks, local area networks, metropolitan area networks, and so on; and
- a feed reader module 420 for handling content items from content feeds; and
- a client application 430, such as a web browser.

The feed reader module 420 includes a content item identification module 422 that identifies additional content items satisfying predefined criteria with respect to a user-selected content item. The feed reader module 420 also includes a gallery module 424 for presenting information corresponding to the selected and additional content items in a gallery view.

In some embodiments, the feed reader module 420 may be a script-based module, embedded in a web page served from the server system 104 (FIG. 1). The web page may be rendered by a client application 430, such as a web browser, at the client computer 400. When the web page is rendered, the feed reader module 420 is executed, thereby providing a web-based interface to the server system 104. The script-based feed reader module may be written in JavaScript, ECMAScript or any other suitable scripting language.

In some other embodiments, the feed reader module 420 may be a standalone application stored in memory 404 of the client computer 400. The standalone application may include, but is not limited to a feed aggregator application. In further other embodiments, the feed reader module 420 may be an add-on or a plug-in to another application. For, example, the feed reader module 420 may be a plug-in to an email application.

In some embodiments, received content items may be cached locally in memory 404. Similarly, a user's list of content feed subscriptions may also be cached locally in memory 404.

Each of the above identified elements may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 404 may store a subset of the modules and data structures identified above. Furthermore, memory 404 may store additional modules and data structures not described above.

Figure 5:
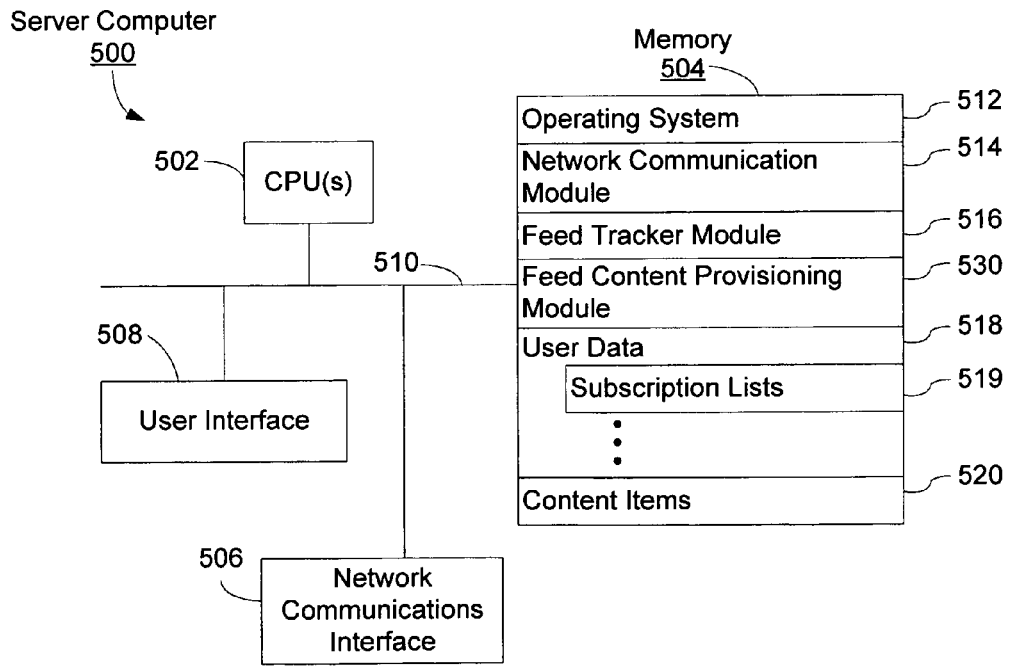
FIG. 5 is a block diagram illustrating a server computer in accordance with some embodiments.

FIG. 5 is a block diagram illustrating a server computer in accordance with some embodiments. The server computer 500 typically includes one or more processing units (CPU's) 502, one or more network or other communications interfaces 506, memory 504, and one or more communication buses 510 for interconnecting these components. The server system 500 optionally may include a user interface 508, which may include a display device (not shown), and a keyboard and/or a mouse (not shown). Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. Memory 504, or alternately one or more non-volatile solid state storage devices within memory 504, includes a computer readable storage medium. In some embodiments, memory 504 stores the following programs, modules and data structures, or a subset thereof:

- an operating system 512 that includes procedures for handling various basic system services and for performing hardware dependent tasks;
- a network communication module 514 that is used for connecting the server system 500 to other computers via the one or more communication network interfaces 506 and one or more communication networks, such as the Internet, other wide area networks, local area networks, metropolitan area networks, and so on;
- a feed tracker module 516 for retrieving content items for storage periodically and/or as content feeds are updated;
- user data 518, which includes data for each user of the service; and
- content items 520, which include retrieved content items from content feeds to which users of the service have subscribed.

The user data 518 stores data for users of the service, such as login information and user preferences. The user data 518 includes subscription lists 519, which include lists of users' feed subscriptions. Each user has a corresponding list of content feed subscriptions. In some embodiments, the server computer 500 may further store feed subscription information in one or more tables (both not shown). The feed subscription information tables store information associated with content feeds, such as the locations of the feeds (e.g., the feeds' URLs) and per-user subscription information with respect to individual content feeds.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 504 may store a subset of the modules and data structures identified above. Furthermore, memory 504 may store additional modules and data structures not described above.

Although FIG. 5 shows a "server computer," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers.

Figure 6:
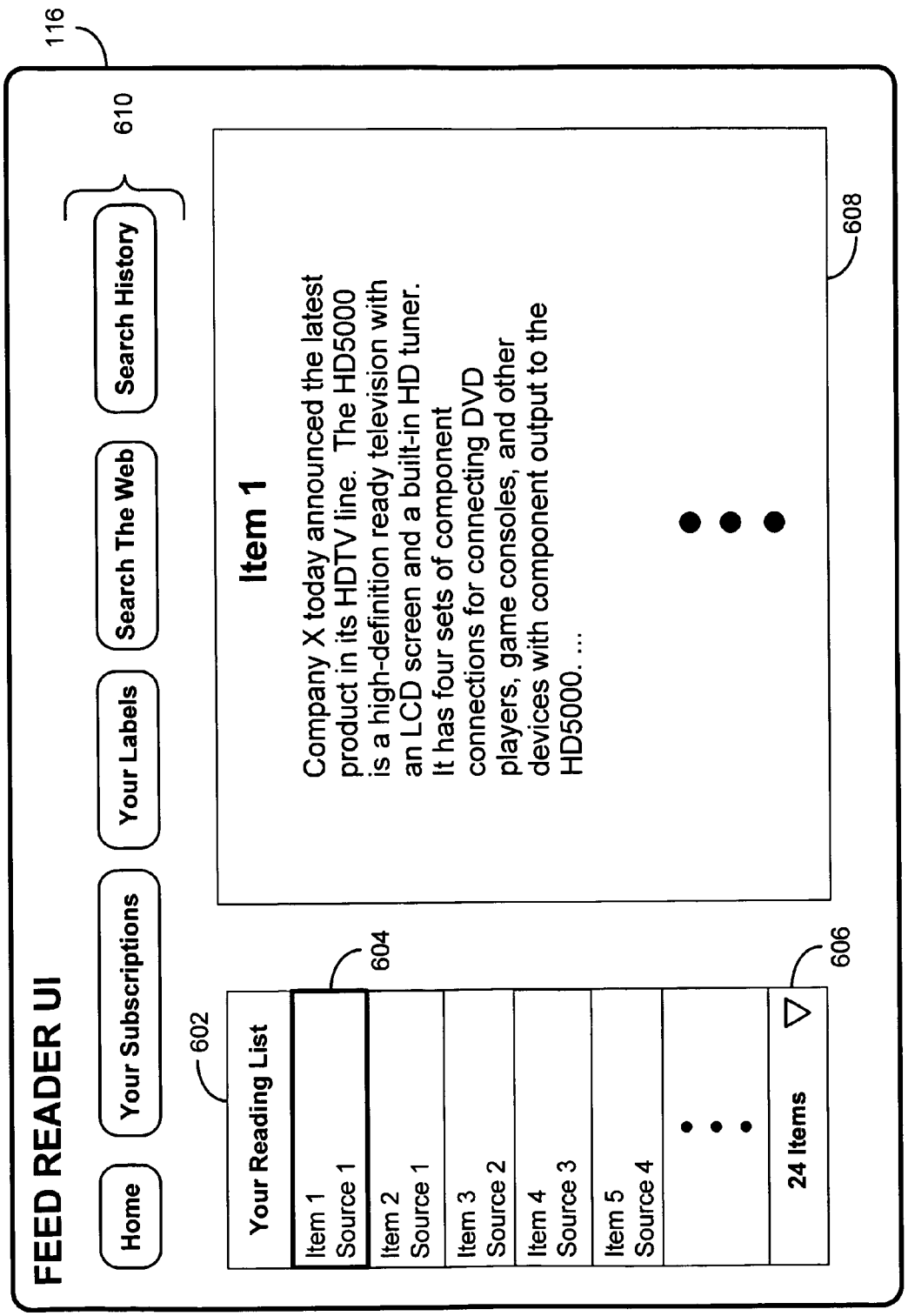
FIG. 6 is a diagram illustrating a feed reader user interface with a universal view in accordance with some embodiments.

FIG. 6 illustrates a feed reader user interface with a "universal view" in accordance with some embodiments. The user, via the feed reader user interface 116, may view, among other things, content items from her subscribed content feeds. The feed reader user interface 116 (hereinafter the "UI") includes one or more buttons, menus, links, and the like 610 for activating and deactivating various functions and features.

The user may view the content items in a universal view. The universal view includes a list 602 of content items from all of the user's subscribed feeds. The content items 604 shown in the list are interleaved without regard to source. In some embodiments, the list is sorted by publication date and time, for example in reverse chronological order. Also, in some embodiments, the list may show only content items that the user has not viewed. The list presents identifying information for the content items, so that the user can identify a content item she wishes to view and select it. Because the UI 116 may have a finite size and the list may include more items than can fit into the UI, the UI 116 may display a subset of the content items at a given time and the user may scroll through the list to find other content items. The list may also include an indicator 606 of how many content items are in the list in total. Alternatively, the indicator 606 may indicate the number of content items yet to be viewed.

From the list, the user may select a content item. When the user selects an item from the list in the universal view, the UI 116 may display the full version of the content in a viewer region 608. For example, if the selected content item (indicated by a box with a thick border) includes a link to an article at a news web site or a link to a blog posting, the article or the blog posting, respectively, may be displayed in the viewer region 608.

In the UI 116, a gallery feature may be enabled. When the feature is enabled and a content item is selected from the list 602, instead of displaying the full version of the content in the viewer region 608, a gallery view of information corresponding to the selected content item 605, FIG. 7, and additional content items may be displayed in the viewer region 608.

Figure 7:
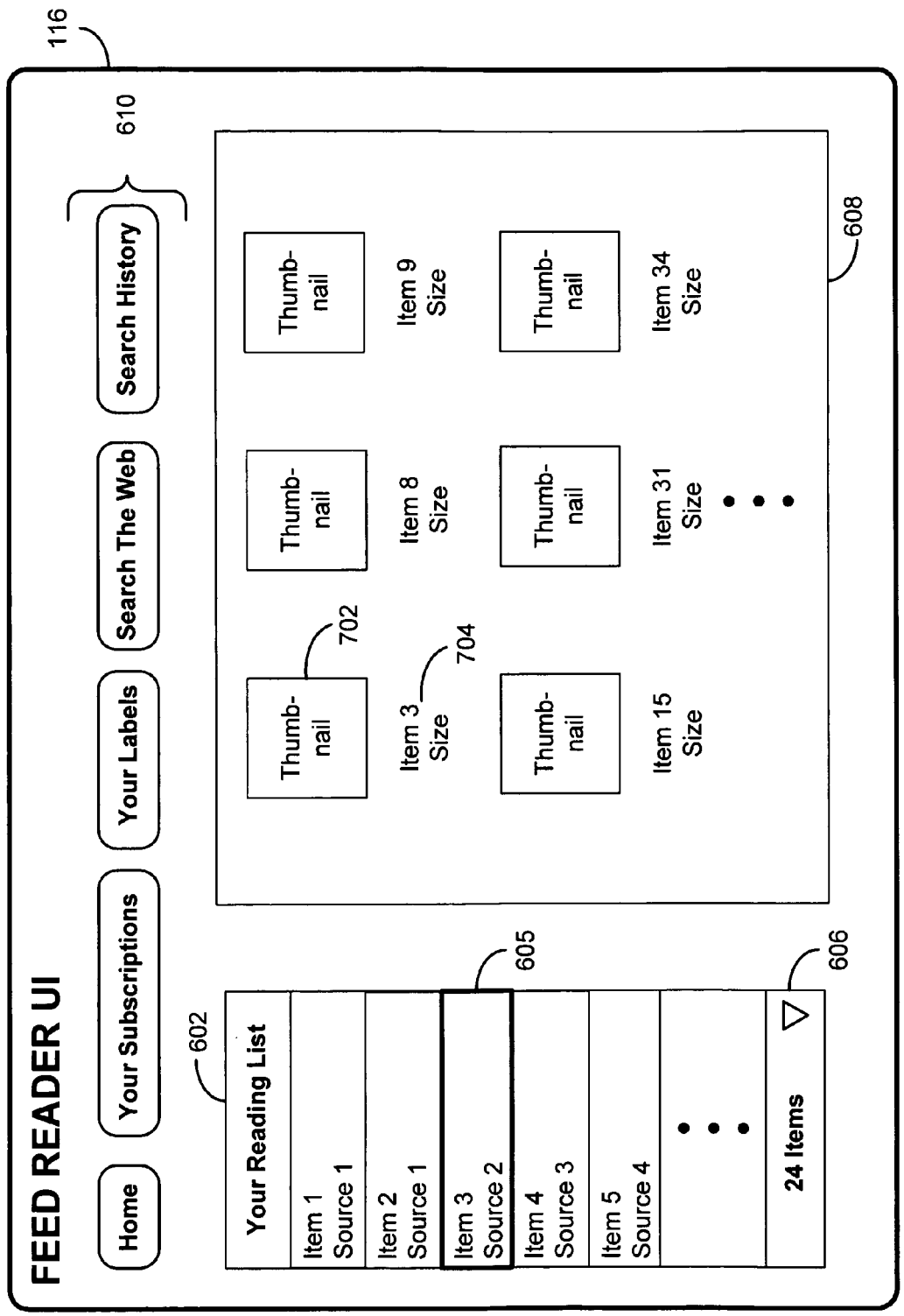
FIG. 7 is a diagram illustrating a feed reader user interface with a thumbnails gallery in accordance with some embodiments.

When the selected content item includes an image, the information that is displayed in the gallery view includes thumbnails of the selected content item and additional content items that also include images, as illustrated in FIG. 7. In some embodiments, the additional content items are all from the same content feed as the selected item. In other embodiments, the additional content items may include content items from the same content feed as the selected item as well as content items from different content feeds. For each of the selected content item and additional content items, the gallery view presents a thumbnail 702 and information 704 corresponding to the image, such as a name of the image (which may be derived from the title of the content item or the file name) and a size (which may be the size of the image file or the dimensions of the image in pixels). The user may select one of the thumbnails in the viewer region 608 to open the image in the viewing region or in a new window.

Figure 8:
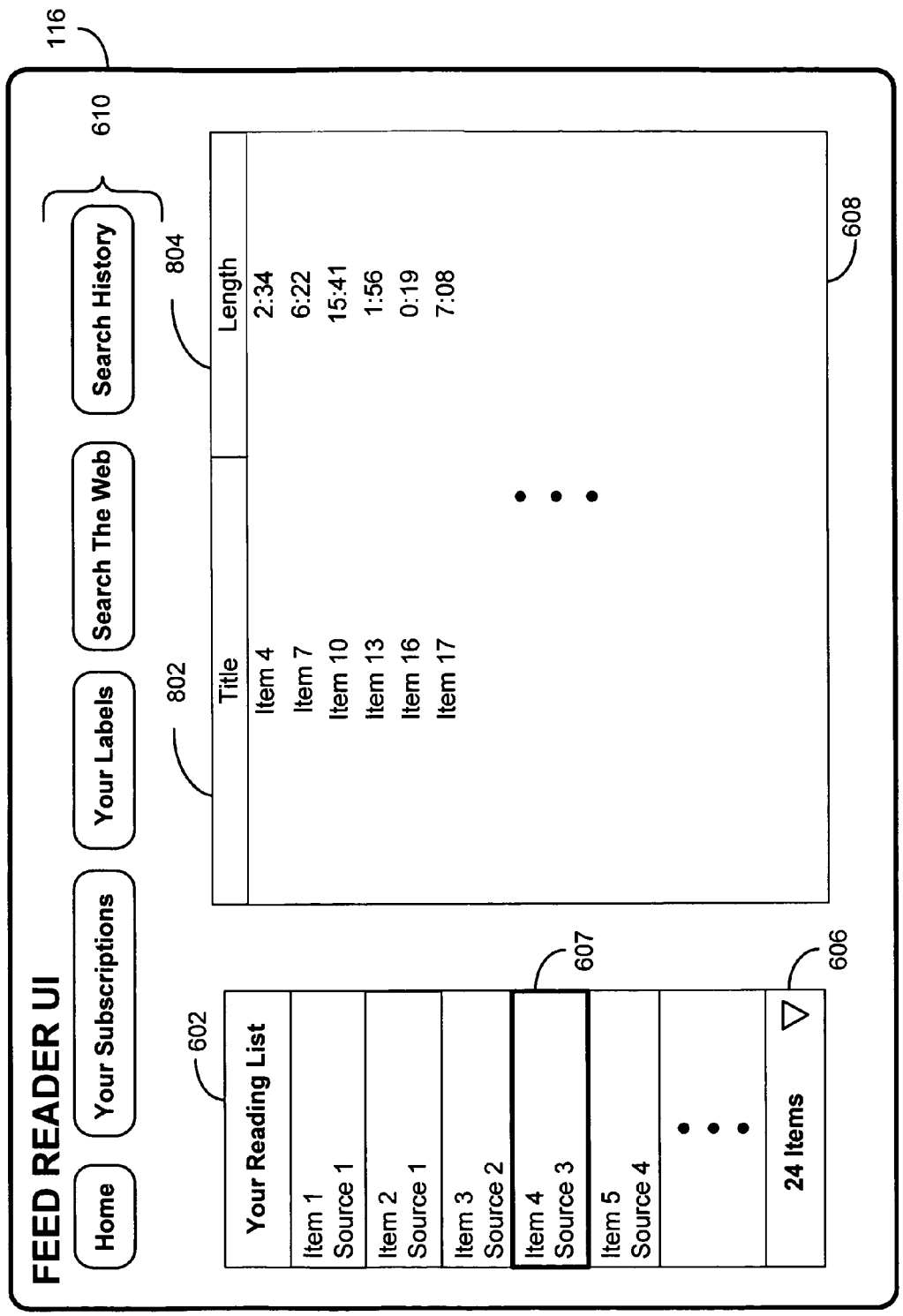
FIG. 8 is a diagram illustrating a feed reader user interface with a playlist gallery in accordance with some embodiments.

When the selected content item (e.g., content item 607 in FIG. 8) includes digital video or digital audio, the information that is displayed in the gallery view includes a playlist of the video or audio clips, respectively, of the selected content item and additional content items, as illustrated in FIG. 8. As in the example discussed above with respect to FIG. 7, in some embodiments the additional content items are all from the same content feed as the selected item, while in other embodiments the additional content items may include content items from the same content feed as the selected item as well as content items from different content feeds. In some embodiments, for each of the selected content item and additional content items, the gallery view presents a title of the clip 802 (which may be derived from the title of the content item, the file name of the clip, or metadata embedded in the clip) and a running time 804 of the clip. The user may select one of the clips in the viewer region 608 to access the clip and playback controls for the clip.

Figure 9:
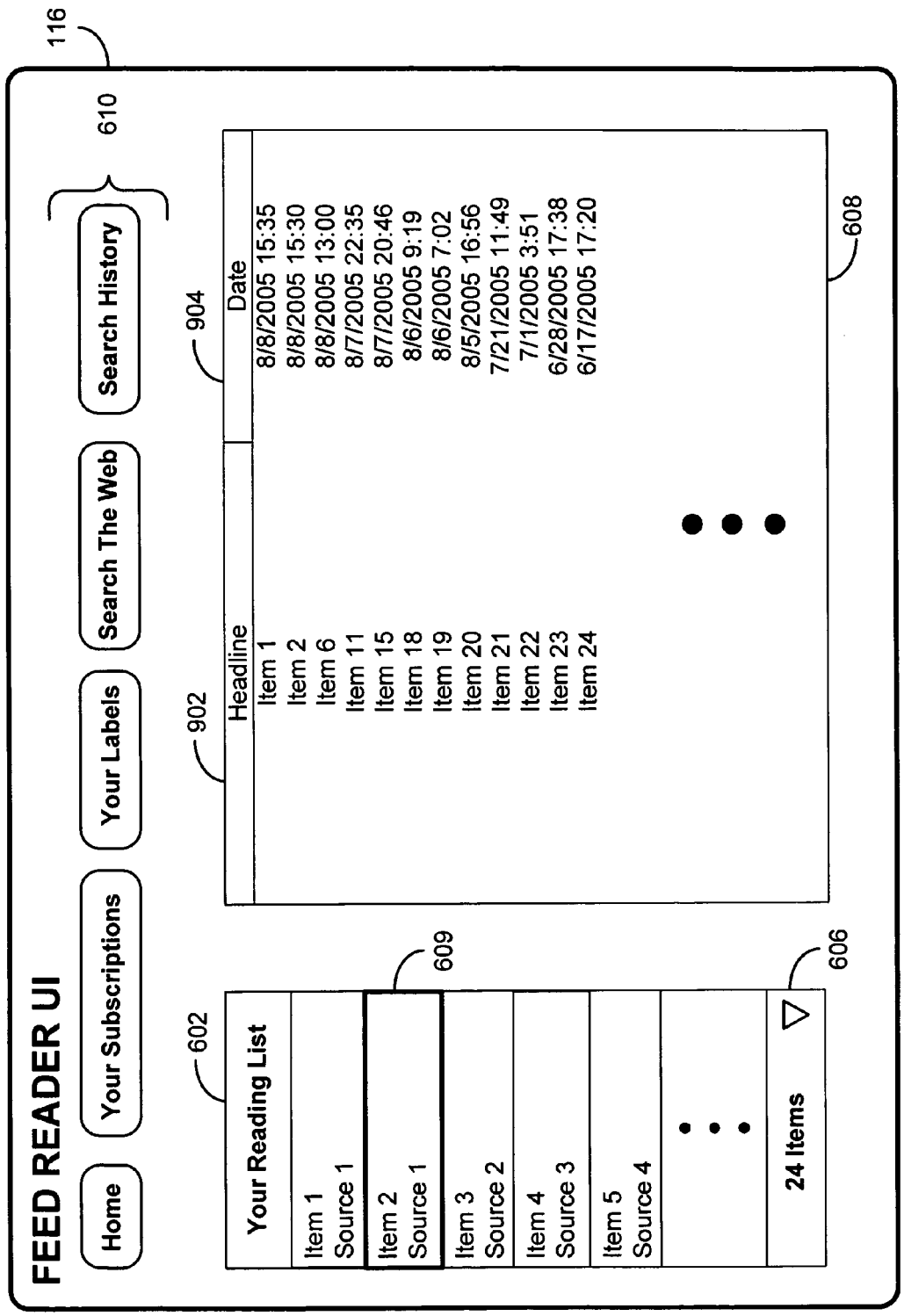
FIG. 9 is a diagram illustrating a feed reader user interface with a headlines gallery in accordance with some embodiments.

In some embodiments, the gallery view may display information corresponding to a selected content item and additional, identified content items, when the selected content item and the identified content items include a title and link to the full version of the content but no content itself, as illustrated in FIG. 9. That is, the identification criterion is that if the selected content item 609 includes a title and location but no actual content, then additional content items that follow the same pattern of having a title and a location but no actual content are identified. The viewer region 608 shows the title of each of the selected and additional content items as a headline 902 of the content item and, optionally, a date 904 of each content item. In other embodiments, the gallery of content items may be displayed in a number of different ways, for example using a grid instead of a list. The user may select one of the content items in the viewer region 608 to access the full version of the content to which the content item links.

Figure 10:
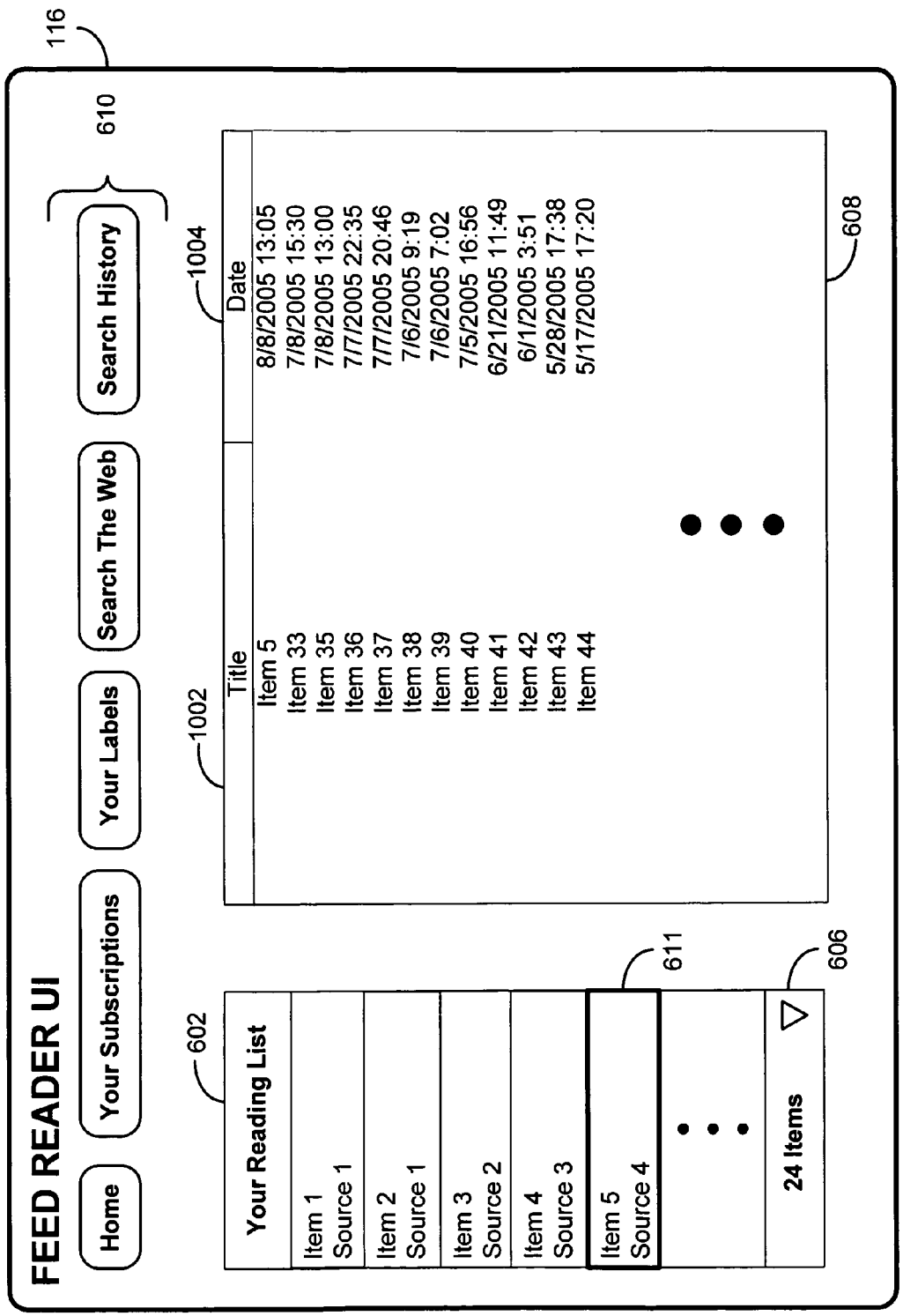
FIG. 10 is a diagram illustrating a feed reader user interface with a same source gallery in accordance with some embodiments.

In some embodiments, additional content items from the same source content feed as the selected content item 611 may be displayed in the gallery view, as shown in FIG. 10. Titles 1002 and dates 1004 of the selected and additional content items may be displayed in the viewer region 608. The user may select one of the content items in the viewer region 608 to access the content item.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of presenting content, comprising:
receiving, by a client system distinct from a server system, a plurality of feed content items from the server system;
presenting, by the client system, a list of feed content items received from the server system, including displaying identifying information associated with at least a subset of the feed content items in the list at a given time;
in response to user selection of a respective feed content item in the list of feed content items, identifying, by the client system, one or more additional feed content items in the list of feed content items, the one or more additional feed content items having a same content type as the selected feed content item; and presenting, by the client system, previews of the selected and additional feed content items.

2. A computer-implemented method of presenting content, comprising:

receiving, by a client system distinct from a server system, a plurality of content items from the server system;

presenting, by the client system, a list of content items received from the server system, including displaying identifying information associated with at least a subset of the content items in the list at a given time;

in response to user selection of a respective content item in the list of content items, identifying, by the client system, one or more additional content items in the list of content items, the one or more additional content items satisfying predefined criteria with respect to the selected content item; and presenting, by the client system, previews of the selected and additional content items.

3. The method of claim 2, wherein identifying the additional content items comprises identifying additional content items in the list of content items having a same content type as the selected content item.

4. The method of claim 3, wherein the same content type comprises an image content type; and presenting the previews of the selected and additional content items comprises presenting thumbnail images of the selected and additional content items.

5. The method of claim 3, wherein the same content type comprises one of the group consisting of: an audio content type and a video data type; and presenting the previews of the selected and additional content items comprises presenting a playlist of the selected and additional content items.

6. The method of claim 2, wherein presenting the list of content items comprises presenting an interleaved list of content items from multiple sources; and identifying the additional content items comprises identifying additional content items in the list of content items having a same source as the selected content item.

7. The method of claim 2, wherein identifying the additional content items comprises identifying additional content items in the list of content items having a same content type and a same source as the selected content item.

8. The method of claim 2, wherein the list of content items comprises feed content items.

9. A system for presenting content, comprising:

memory;

one or more processors; and instructions, stored in the memory and configured for execution by the one or more processors, that, when executed by the one or more processors, cause the system:

to present a list of content items received from an external server system, including instructions to display identifying information associated with at least a subset of the content items in the list at a given time;

in response to user selection of a content item in the list of content items, to identify one or more additional content items in the list of content items, the one or more additional content items satisfying predefined criteria with respect to the selected content item; and to present previews of the selected and additional content items.

10. The system of claim 9, wherein the list of content items comprises feed content items.

11. A non-transitory computer readable storage medium having stored therein instructions, which when executed by a client computer system distinct from a server system, cause the client computer system to:

present a list of content items received from the server system, including displaying identifying information associated with at least a subset of the content items in the list at a given time;

in response to user selection of a respective content item in the list of content items, identify one or more additional content items in the list of content items, the one or more additional content items satisfying predefined criteria with respect to the selected content item; and present previews of the selected and additional content items.

12. The non-transitory computer readable storage medium of claim 11, wherein the instructions for identifying the additional content items comprise instructions for identifying additional content items in the list of content items having a same content type as the selected content item.

13. The non-transitory computer readable storage medium of claim 12 wherein the same content type comprises an image content type; and the instructions for presenting the previews of the selected and additional content items comprise instructions for presenting thumbnail images of the selected and additional content items.

14. The non-transitory computer readable storage medium of claim 12, wherein the same content type comprises one of the group consisting of: an audio content type and a video data type; and the instructions for presenting the previews of the selected and additional content items comprise instructions for presenting a playlist of the selected and additional content items.

15. The non-transitory computer readable storage medium of claim 11, wherein:

the instructions for presenting the list of content items comprise instructions for presenting an interleaved list of content items from multiple sources;

the instructions for identifying the additional content items comprise instructions for identifying additional content items in the list of content items having a same source as the selected content item.

16. The non-transitory computer readable storage medium of claim 11, wherein the instructions for identifying the additional content items comprise instructions for identifying additional content items in the list of content items having a same content type and a same source as the selected content item.

17. The non-transitory computer readable storage medium of claim 11, wherein the list of content items comprises content items from one or more feed sources.

18. A non-transitory computer readable storage medium having stored therein instructions, which when executed by a client computer system distinct from a server system, cause the client computer system to:

present a list of feed content items received from the server system, including displaying identifying information associated with at least a subset of the feed content items in the list at a given time;

in response to user selection of a respective feed content item in the list of feed content items, identify one or more additional feed content items in the list of feed content items, the one or more additional feed content items having a same content type as the selected feed content item; and present previews of the selected and additional feed content items.

* * * * *